Feb. 28, 1956  A. M. PETERSON  2,736,123
ARTIFICIAL LURE
Filed June 24, 1954

INVENTOR.
ALDON M. PETERSON
BY
H. F. Woodward
atty

United States Patent Office 2,736,123
Patented Feb. 28, 1956

2,736,123

ARTIFICIAL LURE

Aldon M. Peterson, Deephaven, Minn.

Application June 24, 1954, Serial No. 439,043

5 Claims. (Cl. 43—42.09)

This invention relates to the art of catching fish by means of hook and line, the invention having reference more particularly to an artificial lure.

An object of the invention is to provide a novel means whereby a ring carrying the hook or hook shank may be removably secured to the lure body. This novel arrangement of parts makes it possible to place a large number of lure bodies or the like in a bait box in close proximity to each other without the fear of having the hook element becoming entangled.

A further object of the invention is the provision of means to enable the lure body to be changed without changing the bait hook.

While two particular structures are set forth herein it is to be understood that they are presented for illustrative purposes only and are not to be accorded any interpretation such as might have the effect of limiting what is claimed as the invention short of its true and comprehensive scope in the art.

Referring to the drawings forming a part of this specification, Figure 1 is a side elevational view of the lure;

Figure 1:
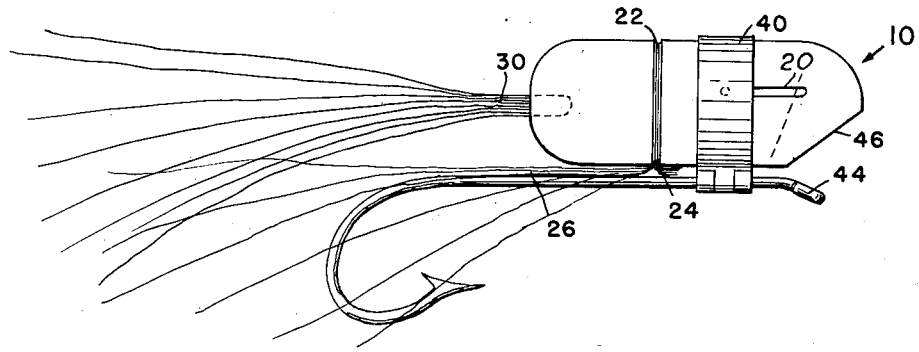

Referring in detail to the drawing, 10 designates the lure body composed of two sections 12 and 14. It is generally preferred that the body be made of plastic and in various colors or hues. The body is cross-sectionally circular and is provided with a weight receiving opening 16 on the underside of the body and spaced from the front end less than one-third the length of the body. An annular groove 18 extends around the body and intersects and communicates with the weight receiving opening 16 and the channel 20 which extends from the groove 18 to the front end on the bottom of the body. The body may be provided with a groove 22 for the reception of means 24 for holding hairs, feathers 26 or the like in place on the body. A groove 28 extends longitudinally of the body and intersects groove 22. In the groove 28 hairs 26 are placed. It generally is preferred that suitable waterproof adhesive be employed for securing the hairs in the groove 28. At the rear end of the body hairs 30 or the like are also adhesively secured, and in an opening provided therefor. It is to be understood that the body may be made of various materials but making the body in two sections of plastic and securing the halves together has proven very economical.

Figure 2:
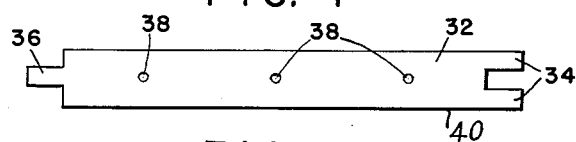
Figure 2 is a plane view of a strip of material used for making the band or ring.
Figure 3:
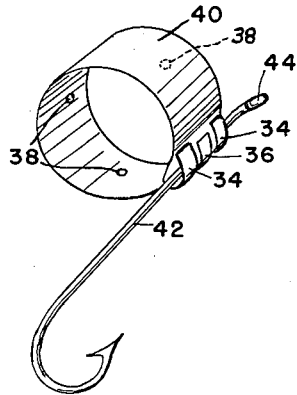
Figure 3 is a perspective view of the band carrying the bait hook.

A strip of solderable material 32 is cut in the manner shown in Figure 2 with tabs 34 at one end and a tab 36 at the other end to provide a band 40. One or more detents or pins 38 are provided in the strip of material. The purpose of the detent or detents is to hold the ring removably on the lure body. The detents 38 may be formed by forcing metal of the material inwardly by a punch or the like. One detent 38 should be placed in the band 40 on the opposite side of the band to which the hook 42 is secured. This arrangement insures that the band is properly secured to the body when the hook is in the fishing position.

The hook shank 42 is secured to the band 40 by solder but it is preferred that the tabs 34 be bent over the hook shank and tabs 36 pass between tabs 34. The tabs 34 and 36 may be then soldered on the hook shank. This arrangement insures that the hook shank and the ring 40 will not separate under normal fishing conditions. The band 40 is secured to the shank 42 adjacent eye 44. The band 40 is of greater width than the groove 18 and must be of sufficient width to more than cover the groove 18 and the weight receiving opening 16 when in position on the lure body. The band 40 has an inside diameter just slightly greater than the largest diameter of the lure body when assembled. A small shot or shots are placed in the weight receiving opening 16 when it is desired to use the lure below the water surface. The band is positioned so that a detent 38 may slide along a slot 20 until the detent meets the groove 18. The band 40 is then turned until the hook is in proper position as shown in Figure 1. The detent cooperating with the groove 18 insures that the body and ring are secured together but at the same time provides means of easily separating them. For each detent there must be provided a slot 20 in the body 10.

Figure 6:
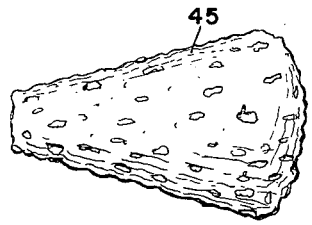
Figure 6 is a view of a resilient bait body for use with a band or ring having a plurality of detents.

In the modified form of lure body 45 shown in Figure 6 the body material is formed of flexible elastic material such as sponge rubber. With flexible body 45 the band 40 must have two or more detents 38 to hold the body within the ring. Of course, the band is removably secured to the sponge rubber body by the detents. If it is desired to have the lure sink, one or more shots are placed under the band 40.

Figure 4:
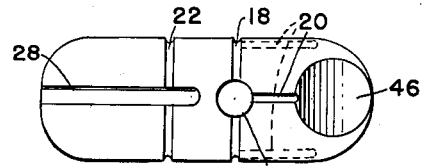
Figure 4 is a bottom plan view of the bait body with the band and hook removed.
Figure 5:
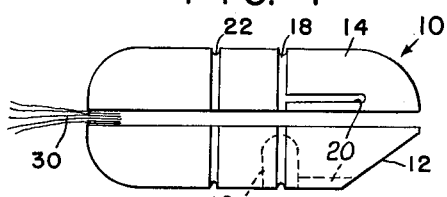
Figure 5 is a side elevational view of the two halves of the bait body before being assembled.

The lure body may be formed on the front end to various shapes but generally should be cut at an angle to provide a flat surface as shown at 46 in Figure 4.

This is a continuation in part of my application Serial No. 292,251, filed June 7, 1952, now Patent No. 2,686,381 issued August 17, 1954.

What is claimed is:

1. A fishing lure comprising a circular in cross-section plug-like body provided on one side with a channel extending from one end to a weight receiving opening in the body, said body being further provided with an annular groove extending around the body and intersecting the channel at the weight receiving opening, a band of greater width than the width of the annular groove and of a width adapted to cover the weight receiving opening, a detent in the band and a hook secured to said band on the opposite side to the detent.

2. A fishing lure comprising a body with a channel therein, said channel extending from one end and only part of the length of the body, the body having an annular groove therearound intersecting said channel, a band of greater width than the groove, the band having a detent cooperating with the groove and the channel for removably securing the band on the body and a hook secured to the band on the side opposite to the detent.

3. A fishing lure comprising a body with an underside having a channel in said underside, the body having an annular groove therearound extending at substantially right angles to the channel and intersecting said channel, a band of greater width than the groove, a detent in the band adapted to cooperate with the groove and the channel for removably securing the band on the body and a fishing hook secured to the band on the opposite side to the detent.

4. A fishing lure comprising a body having a substantially circular cross section in combination with a band carrying a hook, said band having detents therein adapted to removably secure the band on the body, one of the detents in the band being in a surface thereof opposite the surface to which the hook is secured.

5. A fishing lure comprising a body with a channel on one side extending only part of the length of the body, said channel extending part of the length of the body from one end thereof, the body having an annular groove extending therearound intersecting the channel, a band, a hook carried by the band, at least one detent in the band on the side opposite that of the hook, said detent cooperating with the groove, the band and the channel for removably securing the hook to the body, said band having a greater diameter than the largest diameter of the body and of greater width than the annular groove said body having a weight receiving aperture in the body at the intersection of the channel and groove, said aperture being adapted to be completely closed by the band secured to the body.

References Cited in the file of this patent

UNITED STATES PATENTS

| | | |
|---|---|---|
| 183,890 | Block | Oct. 31, 1876 |
| 221,728 | Halsey | Nov. 18, 1879 |
| 274,745 | Evans | Mar. 27, 1883 |
| 607,631 | Staley | July 19, 1898 |
| 841,951 | Evans | Jan. 22, 1907 |
| 863,559 | Snigo | Aug. 13, 1907 |
| 1,600,652 | Steenstrup | Sept. 21, 1926 |
| 1,999,702 | Lafond et al. | Apr. 30, 1935 |
| 2,269,615 | Walker | Jan. 13, 1942 |
| 2,546,772 | Neff | Mar. 27, 1951 |
| 2,573,399 | Cannon | Oct. 30, 1951 |
| 2,634,540 | Nelson et al. | Apr. 14, 1953 |
| 2,686,381 | Peterson | Aug. 17, 1954 |